United States Patent [19] [11] 4,192,674
Krismer et al. [45] Mar. 11, 1980

[54] METHOD OF OBTAINING TANTALUM-NIOBIUM FROM ORES HAVING A HIGH TITANIUM CONTENT

[75] Inventors: Bruno Krismer, Goslar; Harmut Pungs, Laufenburg, both of Fed. Rep. of Germany

[73] Assignee: Hermann C. Starck Berlin, Berlin, Fed. Rep. of Germany

[21] Appl. No.: 925,834

[22] Filed: Jul. 18, 1978

[30] Foreign Application Priority Data

Jul. 22, 1977 [DE] Fed. Rep. of Germany ....... 2733193

[51] Int. Cl.² .................. C22B 4/00; C21B 15/02; C22B 9/10
[52] U.S. Cl. .................................. 75/10 R; 75/27; 75/257
[58] Field of Search .................... 75/10 R, 27, 257

[56] References Cited

U.S. PATENT DOCUMENTS

| | | |
|---|---|---|
| 2,905,549 | 9/1959 | Taylor .................................. 75/27 |
| 2,905,550 | 9/1959 | Taylor .................................. 75/27 |
| 2,992,095 | 7/1961 | Li ......................................... 75/27 |
| 3,184,302 | 5/1965 | Chindgren ........................... 75/27 |
| 3,232,749 | 2/1966 | Yntema ................................ 75/27 |

*Primary Examiner*—P. D. Rosenberg
*Attorney, Agent, or Firm*—Wegner, Stellman, McCord, Wiles & Wood

[57] ABSTRACT

A process for obtaining metal rich in tantalum and niobium from ore having a high titanium content comprising stepwise electrothermal ore reduction in the presence of aluminum, calcium oxide and barium sulfate.

12 Claims, No Drawings

METHOD OF OBTAINING TANTALUM-NIOBIUM FROM ORES HAVING A HIGH TITANIUM CONTENT

BACKGROUND OF THE INVENTION

1. Field of the Invention

This invention relates to a tantalum-niobium ore reduction process and, more particularly, to a process for obtaining metal rich in tantalum and niobium and lean in titanium from a titanium-rich tantalum-niobium ore.

2. The Prior Art

A number of refining methods for enriching the tantalum-niobium content of tantalum-niobium-lean ores and slags having $TiO_2$ concentrations of up to 15% are known, and can be generally classified in two groups:

(I) Production of metal concentrates by mineral acid extraction; and (II) Electrothermal ore reduction in the presence of carbon with subsequent wet-chemical purification of resulting carbides, followed by conversion of the carbides to tantalum-niobium oxide concentrates by oxidative roasting.

Methods typical of Group I are described in U.S. Pat. No. 3,972,710 (H. C. Starck Company), Austrian Pat. No. 315,512 (Union Carbide Corporation), U.S. Pat. No. 3,658,511 (Kawecki Berylco), and British Pat. No. 1,020,453 (Wah Chang).

In these processes, considerable quantities of relatively expensive mineral acids, such as hydrofluoric acid, are consumed. These processes are therefore expensive and require subsequent waste water treatment. Further, the presence of titanium oxides in the ore increases acid consumption and results in the formation of water-insoluble precipitates which are very difficult or impossible to remove from the reaction system by filtration. For these reasons, the Group I methods cannot be economically used for reduction of titanium-rich tantalumniobium ores, slags or residues.

Representative Group II methods are described in U.S. Pat. Nos. 3,811,867 (J. J. Scott), 3,721,727, 3,585,024 and 3,447,894 (Kawecki), and 2,972,530 (Zimmerley).

The initial step of each of the Group II processes is the formation of tantalum and niobium carbides and separation thereof from gangue by the melting of ores in an electric arc furnace, with the addition of carbon sources, in a reducing atmosphere. Depending on the gangue composition and the nature of the ore, temperatures of between 1200° C. and 1800° C. are required.

Titanium oxides are also converted to stable carbides under such carbothermal reduction conditions. Economical separation of tantalum and niobium carbides from the resulting titanium carbides is impossible. With ores having a titanium oxide content of more than 50%, as is the case in many naturally occurring ores having less than 20% $(NbTa)_2O_5$, furnace contents solidify during carbothermal reduction. Therefore, the methods of Group II are not suitable for separation of tantalum and niobium from carriers having a high titanium content.

SUMMARY OF THE INVENTION

According to the present invention, a high grade tantalum-niobium metal having 60–70% niobium-tantalum may be obtained from ores, slags and residues having a $TiO_2$ content of 60% or more and a substantial tin content.

The method of the invention comprises a one- or two-step reduction process. Unwanted metals such as tin and iron are removed from the ore in the first step by reductive roasting in an electric arc furnace in the presence of aluminum and calcium oxide (CaO). A substantially tin-free slag containing nearly all of the charged titanium, tantalum and niobium remains. The first step is required only for ores having significant tin or iron concentrations.

A second reduction step separates $TiO_2$ from the tantalum-niobium containing slag of the first step to form a metal fraction rich in niobium-tantalum and lean in titanium. A titanium-rich slag fraction is also formed. The metal may be further refined by acid treatment or oxidative roasting techniques, if desired.

DETAILED DESCRIPTION OF THE INVENTION

Niobium-tantalum ores, slags or residues may contain significant amounts of undesirable tin or iron in oxide form. Reference herein to ore is understood to include other metal carriers such as slags or residues, for example. In the invention's first process step, tin and/or iron bearing niobium-tantalum ore is melted in an electric arc furnace in the presence of aluminum, which acts as a reducing agent, and calcium oxide (CaO). The furnace should be prepared with magnesite or carbon prior to processing, and employs electrodes of graphite or other form of carbon.

The weight of aluminum is between 1.3 and 3.0 times the aluminum equivalent weight theoretically required for stoichiometric reduction of the tin and iron present in the ore. The weight of the CaO charge is between 0.75 and 1.5 times the aluminum weight. Voltage is selected dependent upon the furnace geometry, and between 5 cm and 25 cm of each electrode is submerged in the liquid slag to effect a completely quite furnace operation.

Substantially 100% of the tin and between 60 and 90% of the iron accumulate as a mat on the bottom of the furnace shell, and in a metal fraction. Slag, rich in tantalum, niobium and titanium, is removed in several castings, followed by removal of metal. The slag, which is substantially free of tin and depleted in iron content, is cooled and reduced to particles less than about 5 mm in diameter for the second process step. The first process step is required only for ores having a substantial content of tin or iron.

In the second process step, the tin-free slag, which has a high titanium content, is melted in the electric arc furnace in the presence of aluminum, CaO, and barium sulfate ($BaSO_4$), preferably in the form of heavy spar. The weight of aluminum charge is between 1.5 and 3.0 times the aluminum equivalent weight theoretically required for stoichiometric reduction of tantalum, niobium and iron in the slag. The weight of CaO is between 0.3 and 0.5 times the aluminum weight, and the weight of heavy spar is between 0.1 and 0.8 times the aluminum weight.

The ratio of heavy spar to CaO is increased with higher $TiO_2$ content to prevent the formation of high melting point calcium-aluminum titanates. These titanates occur in course crystalline form and separate from the melt to form a matrix which prevents separation of ferro-tantalum-niobium metal from the slag. Addition of heavy spar to the melt prevents formation of a titanate matrix to result in perfect metal-slag separation.

If the ore composition or the composition of the slag from the first process step fluctuates considerably, the amount of aluminum to be used in the second step is determined empirically, as follows: 150% of the aluminum equivalent weight theoretically required for stoichiometric reduction of $Nb_2O_5$, $Ta_2O_5$ and iron oxide in the tin-free ore or first step slag is added to a test melt. More aluminum is added to the test melt until the $Ta_2O_5$ value in the resulting slag is between 0.5 and 1%. The use of this empirically-determined excess proportion of aluminum in the second process step will result in a metal product having a titanium content of less than 5% for slags or residues having a $TiO_2$ content of 50% or more.

The metal produced in the second process step is preferably cast into an ingot to obtain a product having a high tantalum-niobium content. The product often contains between 60 and 80% tantalum-niobium. After size reduction, the metal may be subjected to a conventional acid extraction or oxidative roasting process to obtain a commercially acceptable high-grade tantalum-niobium concentrate.

If a ferroniobium-tantalum product low in titanium is desired, iron may be added in the second process step. If a tantalum-niobium content of less than 60% in such an iron-containing product is desired, the metal is cast after several furnace operations in the presence of excess iron. Continuation of the procedure may continue until the furnace lining is worn.

The following examples are descriptive of the method of the invention, but unnecessary limitations are not to be implied therefrom:

EXAMPLE I

Process Step 1

A furnace burden comprising 1000 kg ore, 66.5 kg aluminum grit (diameter less than 3 mm), and 80 kg CaO was melted in an electric arc test furnace with a wattage of 250 KW and 85 V electrode potential. The current consumption was 1.31 KWh/kg ore. The composition of the ore was:
- 12.31%: $Ta_2O_5$;
- 12.07%: $Nb_2O_5$;
- 12.01%: $Fe_2O_3$;
- 55.9%: $TiO_2$;
- 5.62%: $SnO_2$;
- 1.47%: $SiO_2$;
- balance not determined (percents by weight).

The resulting slag was continuously poured off until the entire furnace burden had been melted. Metal was poured off during the final slag tap. Afer cooling, the slag was reduced in size to granules less than 5 mm in diameter and thoroughly integrated with each other. A slag sample and a sample of the metal were analyzed. The following values were obtained:

1036 kg slag having:
- 11.87%: $Ta_2O_5$;
- 12.01%: $Nb_2O_5$;
- 53.8%: $TiO_2$;
- <0.01%: $SnO_2$;
- 7.7%: CaO;
- 2.2%: $Fe_2O_3$;
- 12.1%: $Al_2O_3$;
- balance not determined.

112.4 kg metal having:
- 39.2%: Sn;
- <0.1%: Ta;
- 1.4%: Nb;
- balance predominantly iron.

The yields of $Ta_2O_5$, $Nb_2O_5$ and $TiO_2$ in the slag were 99.8%, 97.9% and 99.7%, respectively. The yield of tin in the metal was 99.5%, along with 79.5% of the iron and only 1.8% of the niobium and traces of tantalum. The lining of the electric arc furnace was slightly attacked. Small quantities of filter dust account for deviations in the balance.

Process Step 2

The slag of Step 1 was reduced in size to less than 5 mm and mixed with aluminum granules, heavy spar and CaO, as follows:
- 1036 kg slag of Step 1;
- 150 kg Al granules;
- 80 kg heavy spar;
- 50 kg CaO.

The resulting furnace burden was melted in the same electric arc test furnace as in Step 1. The electrode potential was again 85 V. and the wattage was 280 KW. Current consumption per kg of slag was 1.53 KWh. The slag was repeatedly poured off as the furnace filled, and the metal was cast into an ingot. After cooling, the shell of the furnace was disassembled and the metal ingot was separated from the slag. The slag was easily detached from the metal.

1149 kg of waste slag of the following composition was obtained:
- 0.5%: $Ta_2O_5$;
- 0.19%: $Nb_2O_5$;
- 0.08%: $Fe_2O_3$;
- 47.0%: $TiO_2$;
- 33.8%: $Al_2O_3$;
- 10.3%: CaO;
- 6.8% heavy spar.

The balance was dissolved furnace lining material.

The metal ingot weighed 210.3 kg and had the following composition:
- 45.1%: Ta;
- 40.5%: Nb;
- 7.2%: Fe;
- 2.7%: Ti;
- 2.9%: Al;
- 1.2%: Si;
- balance not determined.

The additional total weight of the slag and the metal compared to the original furnace burden weight is attributable to attack on the magnesite furnace lining and to filter dust.

The tantalum and niobium yields over both process steps was 95.1% and 96.3%, respectively. Only 1.7% of the originally charged titanium was found in the metal product.

EXAMPLE II

This example describes the method of the invention as applied to a slag having a low tin content. The slag's composition was as follows:
- 12.7%: $Ta_2O_5$;
- 4.7%: $Nb_2O_5$;
- 0.19%: $SnO_2$;
- 30.25%: $TiO_2$;
- 3.74%: FeO;
- 4.1%: CaO;
- 3.5%: $SiO_2$;

balance not determined.

The slag was reduced in size to fine granules and thoroughly blended with aluminum, CaO and heavy spar, as follows:
1000 kg slag;
92 kg aluminum grit (<3 mm);
41 kg CaO;
18 kg heavy spar;

Because of the low $SnO_2$ content, a tin and iron depletion process step was unnecessary. The furnace burden was melted in the same electric arc furnace as in Example 1 at an electrode potential of 85 V. and a furnace wattage of 300 KW. 1.1 KWh was consumed per kg of furnace burden. Slag was poured off twice as the furnace casing was filled, and product metal was cast into an ingot. After cooling, the furnace was disassembled and the residual slag was separated from the ingot.

The metal block weighed 186.7 kg and had the following composition:
tantalum: 51.8%;
niobium: 16.9%;
iron: 15.2%;
titanium: 3.9%;
tin: 0.8%;
silicon: 2.5%;
aluminum: 3.9%;
balance not determined.

The total slag weight was 992 kg and 9.2 kg filter dust had accumulated in the furnace filter. It is evident, therefore, that some lining material had gone into solution. The average slag analysis was as follows:
0.9%: $Ta_2O_5$;
0.2%: $Nb_2O_5$;
29.4%: $TiO_2$.

The balance was not determined since it was not important for yield control.

The yields of tantalum and niobium in the metal were 93% and 96%, respectively, with only 4% of the original titanium remaining in the metal.

The metal was reduced to grains smaller than 1 mm and roasted in an oxidizing atmosphere in a revolving cylindrical furnace and was thereby found to provide an excellent source of pure niobium and tantalum oxides.

The foregoing detailed description is given for clearance of understanding only and no unnecessary limitations should be understood therefrom, as modifications will be obvious to those skilled in the art.

We claim:

1. A process for reducing an ore having a substantial content of tantalum, niobium and titanium oxides and being substantially free of tin and iron oxides to obtain a metal having a substantial tantalum and niobium content, said process comprising the steps of:
melting said ore in the presence of calcium oxide, heavy spar and metallic aluminum in an electric arc furnace, the weight of said aluminum being between about 1.5 and 3.0 times the equivalent weight of aluminum theoretically required for the stoichiometric reducton of the total tantalum and niobium in the ore, the weight ratio of said calcium oxide to said aluminum being between about 0.3 and 0.5, and the weight ratio of said heavy spar to said aluminum being between about 0.1 and 0.8, the weight ratio of said heavy spar to said calcium oxide being selected to effectively prevent the formation of calcium-aluminum titanates, to form a metal fraction rich in tantalum and niobium and lean in titanium relative to said ore, and a slag fraction; and
separating said metal fraction from said slag fraction.

2. A process for reducing an ore having a substantial content of tantalum, niobium, titanium, tin and iron oxides to obtain a metal having a substantial tantalum and niobium content, said process comprising the consecutive steps of:
melting said ore in an electric arc furnace in the presence of metallic aluminum and calcium oxide, the weight of said aluminum being between about 1.3 and 3.0 times the equivalent weight of aluminum theoretically required for the stoichiometric reduction of the total tin and iron oxides in the ore, and the weight ratio of said calcium oxide to said aluminum being between about 0.75 and 1.5, whereby a first slag fraction lean in tin and iron oxides relative to said ore, and a first metal fraction lean in tantalum, niobium and titanium relative to said ore are formed;
separating said first metal fraction from said first slag fraction;
melting said first slag fraction in the presence of metallic aluminum, calcium oxide and heavy spar in an electric arc furnace, the weight of said aluminum being between about 1.5 and 3.0 times the equivalent weight of aluminum theoretically required for the stoichiometric reduction of the tantalum, niobium, tin and iron oxides in said first slag fraction, the weight ratio of said calcium oxide to said aluminum being between about 0.3 and 0.5, and the weight ratio of said heavy spar to said aluminum being between about 0.1 and 0.8, the weight ratio of said heavy spar to said calcium oxide being selected to effectively prevent the formation of calcium-aluminum titanates, to form a second metal fraction rich in tantalum and niobium and lean in titanium relative to said first slag fraction, and a second slag fraction lean in tantalum and niobium oxides relative to said first slag fraction; and
separating said second metal fraction from said second slag fraction.

3. A process for reducing an ore having a substantial content of tantalum, niobium and titanium oxides and being substantially free of tin and iron oxides to obtain a metal having a substantial tantalum and niobium content, said process comprising the steps of:
melting said ore in the presence of calcium oxide, barium sulfate and metallic aluminum, said aluminum being present in an amount in excess of the equivalent weight of aluminum theoretically required for the stoichiometric reduction of the total tantalum and niobium in the ore, to form a metal fraction rich in tantalum and niobium and lean in titanium relative to said ore, and a slag fraction; and
separating said metal fraction from said slag fraction.

4. The process of claim 3 wherein the melting of said ore is carried out in an electric arc furnace.

5. The process of claim 3 wherein said aluminum amount is between about 1.5 and 3.0 times the equivalent weight of aluminum theoretically required for the stoichiometric reduction of the total tantalum and niobium in the ore.

6. The process of claim 5 wherein the weight ratio of said calcium oxide to said aluminum is between about 0.3 and 0.5, the weight ratio of said barium sulfate to said aluminum is between about 0.1 and 0.8, and the weight ratio of said barium sulfate to said calcium oxide is selected to effectively prevent the formation of calcium-aluminum titanates.

7. A process for reducing an ore having substantial contents of titanium, niobium, titanium, tin and iron oxides to obtain a metal having a substantial tantalum and niobium content, said process comprising the consecutive steps of:
melting said ore in the presence of metallic aluminum and calcium oxide, the weight of said aluminum being in excess of the equivalent weight of aluminum theoretically required for the stoichiometric reduction of the total tin and iron oxides in the ore, whereby a first slag fraction lean in tin and iron oxides relative to said ore, and a first metal fraction lean in tantalum, niobium and titanium relative to said ore are formed;
separating said first metal fraction from said first slag fraction;
melting said first slag fraction in the presence of metallic aluminum, calcium oxide and barium sulfate, the weight of said aluminum being in excess of the equivalent weight of aluminum theoretically required for the stoichiometric reduction of the tantalum, niobium, tin and iron oxides in said first slag fraction to form a second metal fraction rich in tantalum and niobium and lean in titanium relative to said first slag fraction, and a second slag fraction lean in tantalum and niobium oxides relative to said first slag fraction; and
separating said second metal fraction from said second slag fraction.

8. The process of claim 7 wherein the melting of said ore and of said first slag fraction is carried out in an electric arc furnace.

9. The process of claim 7 wherein the weight of aluminum used in said ore melting step is between about 1.3 and 3.0 times the equivalent weight of aluminum theoretically required for the stoichiometric reduction of the total tin and iron oxides in the ore and the weight ratio of said calcium oxide to said aluminum used in said ore melting step is between about 0.75 and 1.5.

10. The process of claim 7 wherein the weight of aluminum used in said first slag fraction melting step is between about 1.5 and 3.0 times the equivalent weight of aluminum theoretically required for the stoichiometric reduction of the tantalum, niobium, tin and iron oxides in said first slag fraction and the weight ratio of said calcium oxide to said aluminum in said first slag fraction melting step is between about 0.3 and 0.5, the weight ratio of said barium sulfate to said aluminum is between about 0.1 and 0.8, and the weight ratio of said barium sulfate to said calcium oxide is selected to effectively prevent the formation of calcium-aluminum titanates.

11. The process of claim 3 wherein said barium sulfate is in the form of heavy spar.

12. The process of claim 7 wherein said barium sulfate is in the form of heavy spar.

* * * * *